United States Patent [19]
Fiore

[11] Patent Number: 5,452,676
[45] Date of Patent: Sep. 26, 1995

[54] HULL CONFIGURATION FOR HIGH SPEED BOAT

[75] Inventor: Paul A. Fiore, Hampton Bays, N.Y.

[73] Assignee: Global Marine Performance, Inc., Hampton Bays, N.Y.

[21] Appl. No.: 270,386

[22] Filed: Jul. 5, 1994

[51] Int. Cl.⁶ ...................................................... B63B 1/32
[52] U.S. Cl. ....................................................... 114/291
[58] Field of Search .............................. 114/61, 56, 288, 114/289, 271, 291

[56] References Cited

U.S. PATENT DOCUMENTS

| | | | |
|---|---|---|---|
| 1,848,018 | 3/1932 | Maranville | 114/291 |
| 3,415,213 | 12/1968 | Nemetz | |
| 4,027,613 | 6/1977 | Wollard | |
| 4,231,314 | 11/1980 | Peters | |
| 4,843,988 | 7/1989 | Clement | |
| 4,903,626 | 2/1990 | Haines | |
| 4,958,585 | 9/1990 | Caldwell, Jr. | 114/271 |
| 5,063,868 | 11/1991 | Fink, Jr. | 114/56 |
| 5,215,025 | 6/1993 | Talmor | 114/56 |
| 5,351,641 | 10/1994 | Robson | 114/288 |

FOREIGN PATENT DOCUMENTS 291788  11/1988  Japan ........................ 114/61

*Primary Examiner*—Jesus D. Sotelo
*Attorney, Agent, or Firm*—Schweitzer Cornman & Gross

[57] ABSTRACT

A high speed planing hull is provided, which is generally of a deep Vee form and which is provided with multiple steps in the fore-and-aft direction in combination with variable dead rise from keel to chine in the steps. The arrangement is such that, when the hull achieves planing speeds, not only is the hull bottom ventilated at the fore-and-aft steps, but the variable dead rise configurations, which provide for elevation of the keel area in relation to the chine area, provide for increased support of the hull near the chines, and relatively less support near the keel. Reduced wetted surface, and therefore frictional drag, is realized, while at the same time providing for a safer and more comfortable ride by improving both longitudinal and lateral stability.

10 Claims, 4 Drawing Sheets

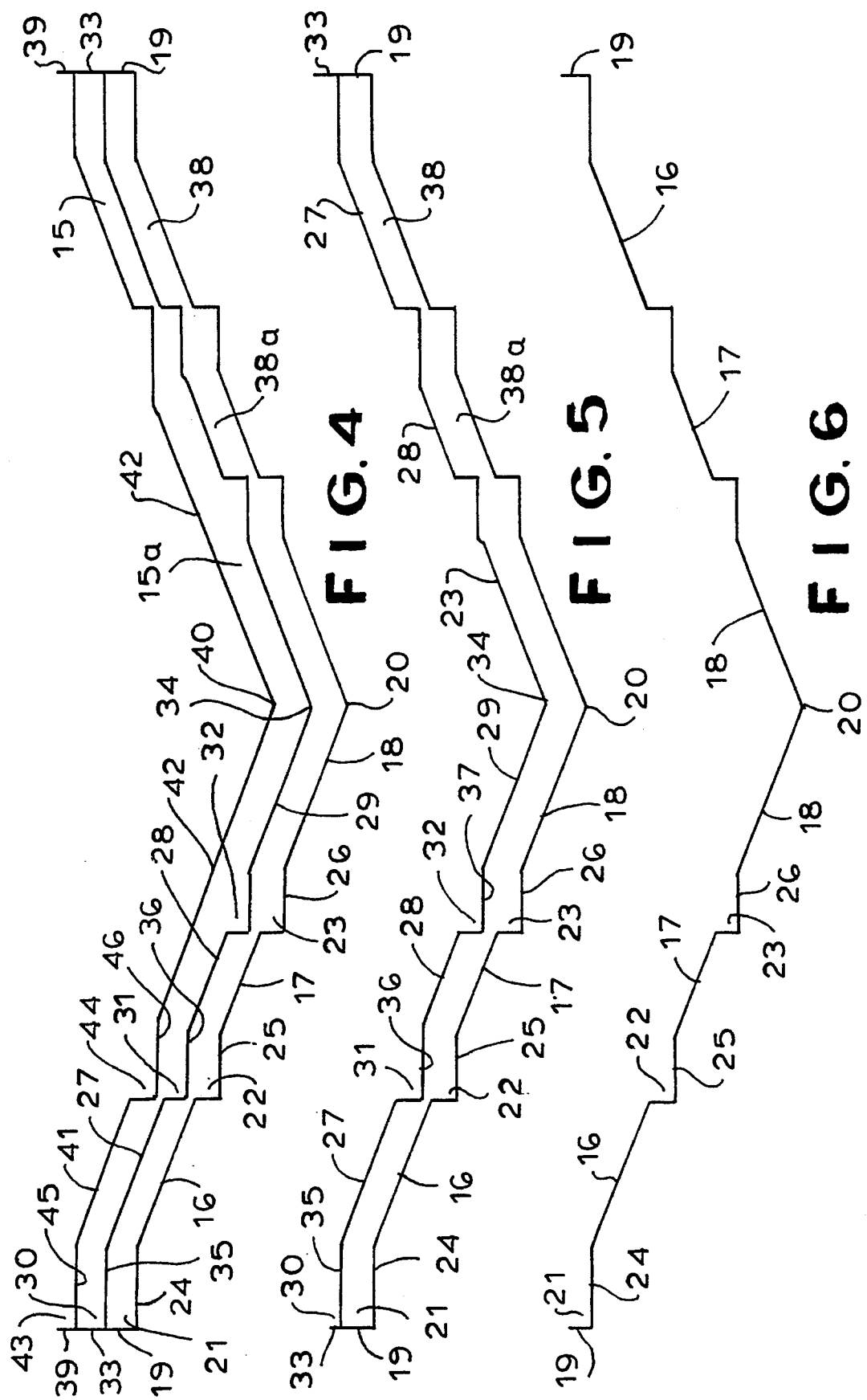

HULL CONFIGURATION FOR HIGH SPEED BOAT

BACKGROUND AND SUMMARY OF THE INVENTION

In the design of high speed, open water boats, the deep Vee hull form is often preferred. Commonly, such hull forms are configured from keel to chine in one or more sections, with generally horizontal, longitudinally extending strakes being formed at transition areas to provide running surfaces. U.S. Pat. Nos. 3,415,213 and 5,063,868 are examples of such hull forms.

When operating at relatively high speeds, with the hull planing along the surface of the water, the frictional drag of the wetted surface of the hull is a significant speed-limiting factor. Accordingly, it is known to provide one or more steps in the hull form such that, as the boat achieves planing speeds, portions of the hull bottom are elevated above the water surface, reducing frictional drag and allowing higher planing speeds to be achieved. Examples of such stepped hull designs are reflected in U.S. Pat. Nos. 4,027,613, 4,231,314, 4,843,988, 4,903,626 and 4,958,585. All the foregoing examples show single-stepped hulls. It is also known to provide multiple steps. In some cases, the keel area of the hull has been recessed, as in U.S. Pat. No. 4,903,626, and in other examples, outer portions of the hull have been recessed at the step, as in U.S. Pat. No. 4,843,988.

The present invention is directed to a high speed hull form capable of operating at the higher limits of boat speeds and in a manner to both minimize running friction between the hull bottom and the water surface and to stabilize and improve the support of the hull by the water at high running speeds. The improved hull form achieves higher running speeds, while at the same time providing a safer and more comfortable ride.

In accordance with a significant feature of the invention, the hull bottom of a high speed watercraft, having a basic deep Vee hull form, is provided with two or more vertical steps in the fore-and-aft direction. In addition, and in combination, the hull is provided in the steps with variable dead rise from keel to chine in that, at each of the steps in the fore-and-aft direction, the height of the step in the region of the keel is greater than the height of the step in the region of the chine. Accordingly, as the vessel achieves planing speeds, ventilation occurs at the regions aft of the steps in a manner already known. In addition, because the areas of the hull bottom in the region of the keel, aft of the steps, is elevated to a greater extent than the bottom surfaces adjacent to the chines, the hull becomes supported to a greater extent in the areas adjacent to the chines and to a lesser extent in areas adjacent to the keel. This simultaneously reduces wetted surface area, and therefore running friction, and also stabilizes the hull against lateral rocking and chine walking, by supporting the hull more from laterally outwardly spaced areas, and less in central areas of the hull.

In accordance with another preferred embodiment of the invention, the attitude of the hull bottom in the areas of the multiple steps is altered slightly relative to the lines of the hull bottom immediately forward of the steps. Thus, the hull surfaces after the first step may be angled upwardly (fore-to-aft) at about one half degree relative to the lines of the hull bottom immediately forward of the step. Likewise, the attitude of each subsequent step, going aft, may be altered slightly (e.g., one half degree, upwardly fore-to-aft) relative to the bottom lines of the adjacent forward step.

In an optimum configuration, the beam of the hull chine increases substantially continuously from bow to transom. This provides additional lateral stability when running under high speed planing conditions, while allowing the narrowed bow and mid sections of the hull to effectively slice through waves.

The combination of multiple steps and variable dead rise, as described, has multiple advantages. It allows for a flatter running angle of the boat while at the same time providing for reduced drag and a concomitant increase in speed, and also improved longitudinal stability. Improved transverse stability is realized by the variable dead rise configuration at each step, elevating the keel areas relative to the chine areas. Hull forms according to the invention can be operated safely and effectively at speeds in excess of 100 miles per hour.

For a more complete understanding of the above and other features and advantages of the invention, reference should be made to the following detailed description of a preferred embodiment of the invention and to the accompanying drawings.

DESCRIPTION OF THE DRAWINGS

FIGS. 4, 5 and 6 are fragmentary cross sectional views as taken generally along lines 4–4, 5—5 and 6—6 respectively of FIG. 1, illustrating the variable dead rise configuration of the hull steps.

DESCRIPTION OF PREFERRED EMBODIMENTS

Figure 1:
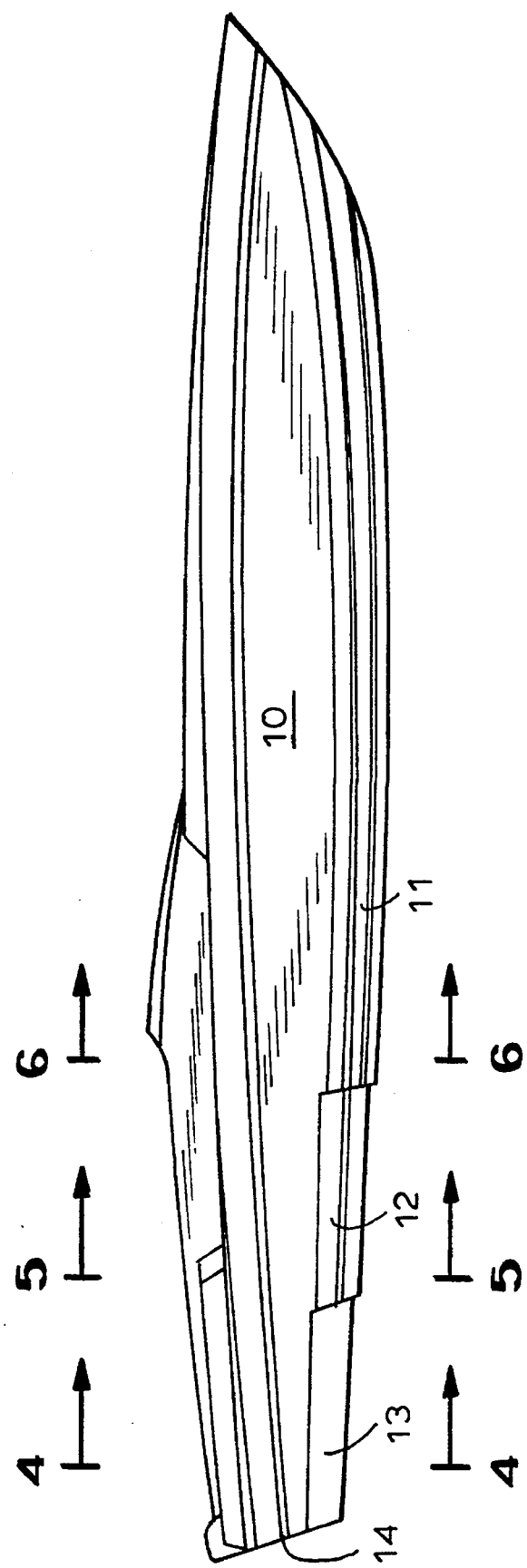
FIG. 1 is a side elevational view of a high speed racing hull incorporating the hull bottom configuration of the invention.

Referring now to the drawings, the reference numeral 10 designates generally the hull of a high speed watercraft, which is provided with a hull bottom of generally deep Vee configuration for high speed in operation in open waters. The hull design illustrated in FIG. 1 is representative of a hull design for a 45–55 foot boat and is provided a hull bottom having a forward portion 11 and first and second stepped portions 12, 13 adjacent to the stern 14. For a vessel of greater length, one or more additional hull steps might usefully be employed. In the illustrated hull, of about 52 feet in length, the respective steps 12, 13 typically may be on the order of seven feet in length each, although it is understood that the specific geometry of the steps is a function of various design factors, such as loading of the hull and the location of its center of gravity, etc. In a typical high speed craft of the proportions indicated in FIG. 1, the center of gravity might typically be located slight aft of the shoulder 15 which defines the commencement of the step 12.

In the illustrated form of the invention, the forward hull portion 11, shown in section in FIG. 6, is provided with a generally deep Vee configuration, comprised of Vee hull portions 16–18. At the chines 19, and also at intermediate points between the chines and the keel 20, are running strakes 21–23. The running strakes, which extend generally longitudinally of the hull, present generally horizontal, downwardly facing surfaces 24–26 respectively which provide concentrated running support for the hull when operating at planing speeds. In the case of the forward hull section 11, the several Vee portions 16–18 of the hull are in general alignment along a common line, as is evident in FIG. 6, and the running strakes 21–23 are in the form of downward projections or interruptions of that common line.

The cross sectional configuration of the first step 12 is shown in FIG. 5. As in the case of the forward hull section 11, the first step 12 has a generally deep Vee configuration, comprised of hull sections 27–29 and running strakes 30–32 which define the hull contour from the chines 33 to the keel 34. The respective running strakes 30–32 provide generally horizontal, downwardly facing running surfaces 35–37, corresponding generally to the downwardly facing strake surfaces 24–26 of the forward hull portions 11.

In a vessel of the proportions indicated, the step-defining shoulder 15 may typically be on the order of 2.5 inches in height at the chine, in the region between the outer Vee hull portions 16, 27, and between the strake running surfaces 24, 35 and 25, 36. Pursuant to the invention, however, the shoulder 15a, in the region from the intermediate chines 22, 31 to the respective keel areas 20, 34 are of increased height, advantageously around 3.25 inches in a vessel of the proportions indicated. Thus, the vertical spacing between the downwardly facing strake surfaces 26, 37 is greater than the spacing between the strake surfaces 24, 35, at the chines, and the intermediate strake surfaces 25, 36. Likewise, the spacing between the Vee hull portions 17, 28 and 18, 29, in the center portions of the hull, is greater than the spacing between the Vee hull portions 16, 27 adjacent to the chines.

Figure 2:
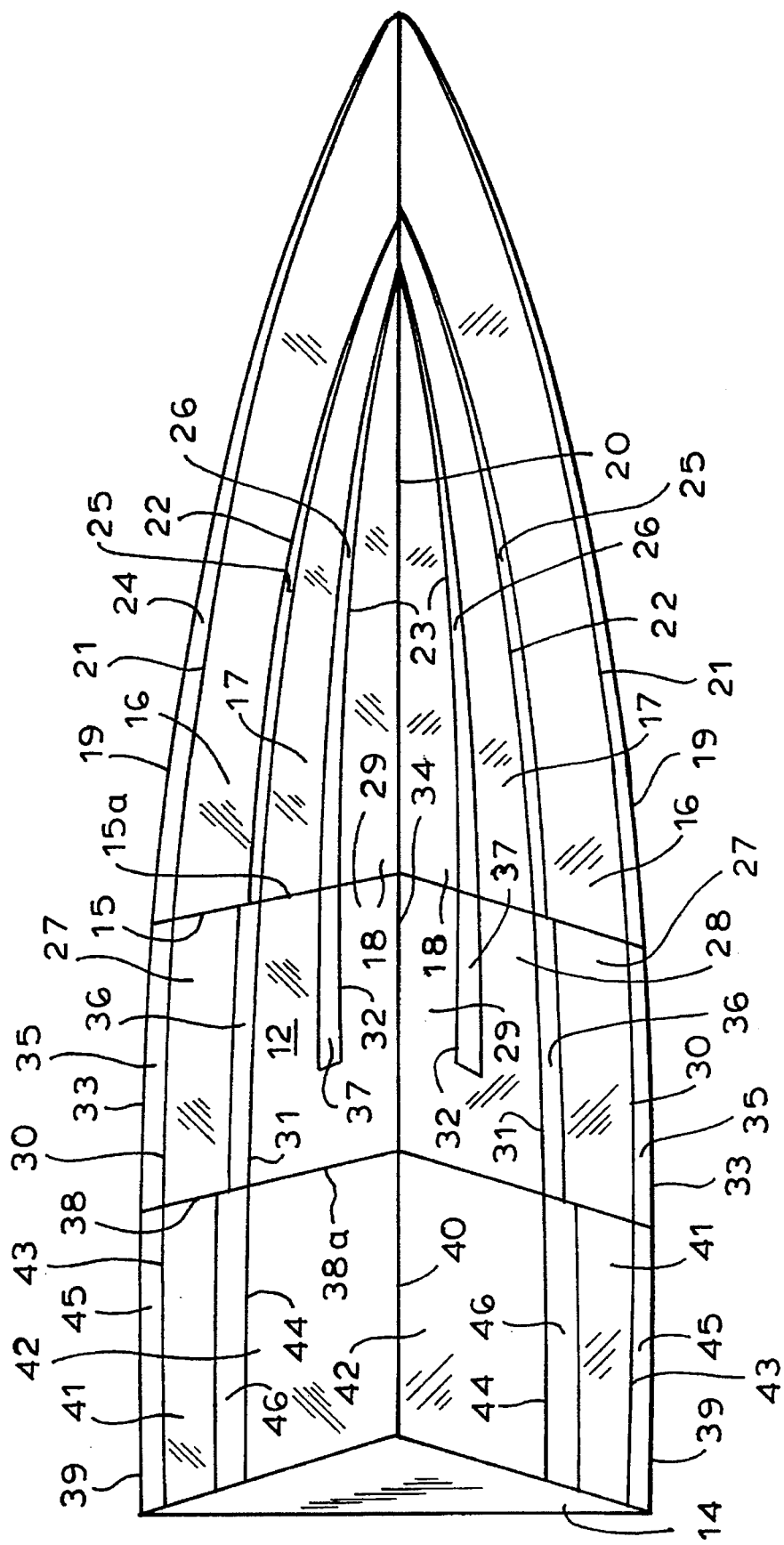
FIG. 2 is a bottom plan view of a hull configuration according to the invention illustrating generally the areas of surface contact between the hull and water at planing speeds.
Figure 3:
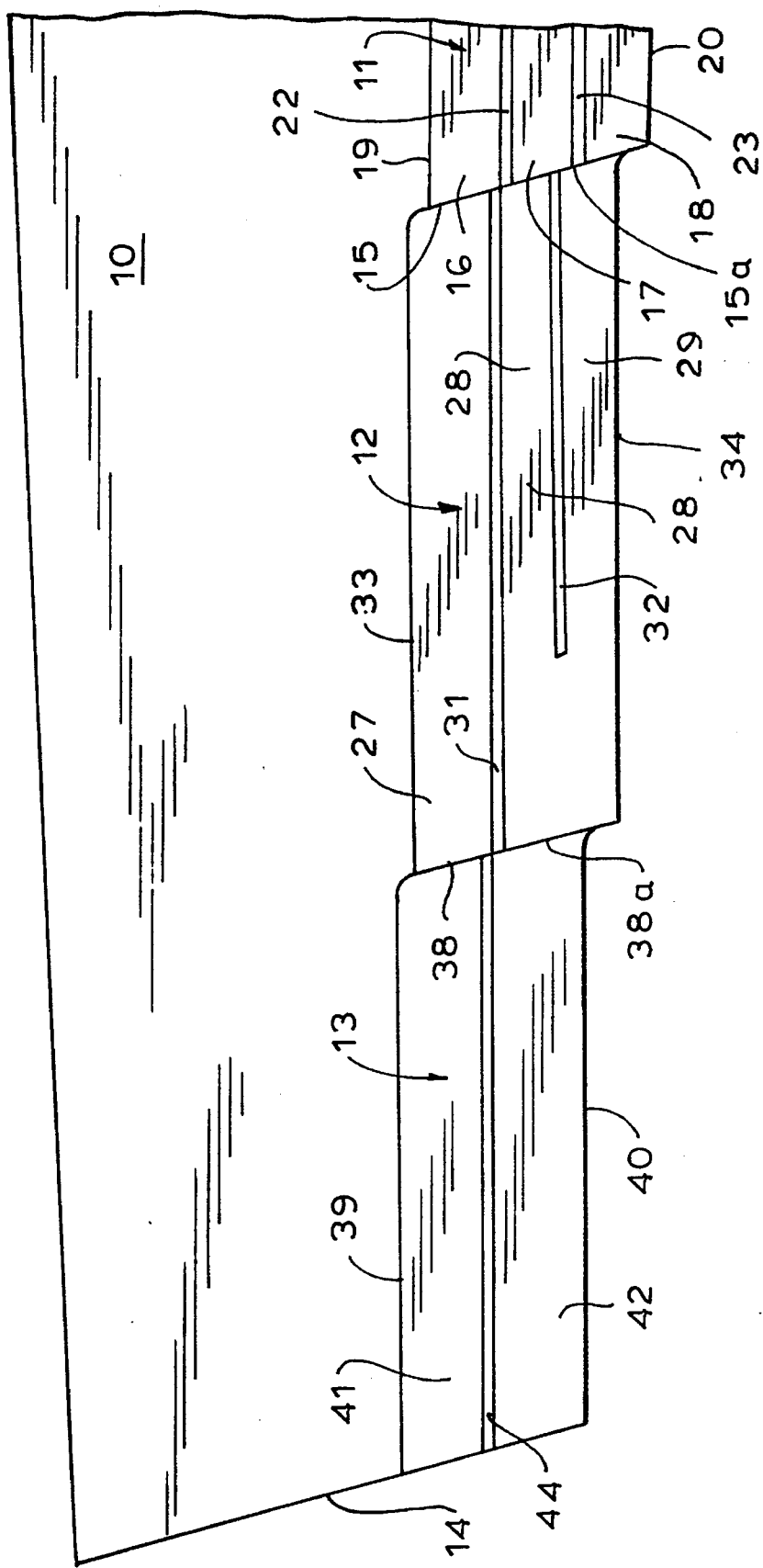
FIG. 3 is an enlarged fragmentary view of an aft portion of the hull of FIG. 1, showing further details of the hull steps.

As reflected in FIG. 2, the innermost running strakes 32 of the step portion 12 may be less than the length of the step 12 itself, as defined by the shoulder 15, forming the commencement of the first step, and a shoulder 38, forming the commencement of the second step 13. The length of these running strakes is a function of (among other things) the weight to be supported, and they can be lengthened, if desired, to accommodate greater weight in aft portions of the vessel, such as resulting from the use of larger or heavier power plants, for example.

With reference to FIG. 4, there is illustrated a cross sectional configuration of the second step 13 which, in the area from the chines 39 to the keel 40, is comprised of first and second Vee hull sections 41, 42 and running strakes 43, 44. The step-defining shoulder 38, in the area from the chines 39 to the inner Vee hull portion 42, has a height, for a vessel of the proportions indicated, of about 2.5 inches. In the area joining the Vee bottom portion 42, the shoulder 38a has an increased height, of approximately 3.25 inches for a vessel of the size indicated. In the illustrated form of hull bottom configuration, intermediate running strakes are not provided, so that the Vee hull portion 42 is uninterrupted from the strake 44 to the keel 40. Longitudinally extending generally horizontal downwardly facing running surfaces 45, 46 are provided by the running strakes 43, 44.

One of the features of the configuration described is that the Vee hull portions 28, 29, of the first step area 12, and the Vee hull portion 42 of the aft step 13 are elevated with respect to the adjacent outer Vee hull portions 27, 41. Additionally, the width of the respective downwardly facing running surfaces 25, 36, 46 of the respective intermediate running strakes 22, 31, 44 becomes progressively greater in each of the hull portions 11, 12, 13 by reason of the elevation of the inner hull portions 28, 29 and 42 relative to the respective running strakes 31, 44. This progression of increasing strake width is evident in FIGS. 4, 5 and 6, and also in FIG. 2.

In the illustrated embodiment of the invention, the dead rise from keel to chine in the area of the stepped sections 12, 13 is executed in a single stage. However, as will be appreciated, the dead rise may be varied in more than one stage as desired, such that the elevation of portions of the hull bottom would increase in a plurality of steps from the chine to the keel. For example, in the first step section 12, the intermediate hull portions 28 could be elevated a first predetermined amount, and the innermost hull sections 29 elevated a second predetermined and greater amount.

In a preferred form of the invention, the length of the steps 12, 13 is approximately equal, as is the height of the step-defining shoulders 15, 15a and 38, 38a. The arrangement is such that, in general, a line connecting corresponding points at aft extremities of the respective hull sections 11, 12, 13, such as the respective keel points 20, 34, 40, is a substantially straight line. Additionally, in a vessel of the size indicated herein, such a straight line will be disposed at an angle of approximately 3° to 4° with respect to an extension of the lines of the forward hull section 11.

Additionally, it is preferred that the lines of the hull in the steps 12 and 13 be disposed with a slight angle with respect to an extension of the aft portions of the hull section 11. That is, from its forward extremities to its aft extremities, the first step portion 12 is inclined slightly upwardly, for example at an angle of about one half degree, relative to an extension of the lines of the hull portion 11 just forward of the step. The second step 13 is also upwardly inclined, from its forward to its aft extremities, at a slight angle relative to the lines of the forward step 12, for example at one half degree. The aft step 13 thus preferably has an angle of about one degree relative to extensions of the forward hull portion 11.

Preferably, the shoulders 15–15a and 38–38a are swept back at a small angle, from keel to chine. The transom 14 also preferably defines a swept-back angle with the hull bottom, as indicated in FIG. 2.

Referring again to FIG. 2 of the drawing, the shaded portions forward of the transom 14 and forward of the respective step-defining shoulders 38–38a, 15–15a are generally representative of the approximate contact areas between the hull 10 with the water, when the vessel is operating at high planing speeds. Comparing the generally triangular contact area (i.e., wetted surface area) of the forward hull portion 11, with the wetted surface areas of the steps 12, 13, it is evident that the relative wetted surface area and the relative running support provided by the central areas of the hull are significantly less at the steps 12, 13, and a relatively greater proportion of the support is provided by the two outer running strakes.

Two important advantages are derived from the arrangement of the invention: The total wetted surface area of the hull is significantly reduced, yet the areas of support for the hull are extended both longitudinally and laterally for improved longitudinal and lateral stability, providing a safer and more comfortable ride, along with potential for higher speeds.

One of the advantages of the hull form of the invention is that it allows for a flatter running angle of the boat, without the frictional drag normally associated with the fact that a flatter running angle normally results in a greater wetted surface area. This provides for increased speed and results in relatively less porpoiseing of the boat in rough seas.

The hull configuration of the invention also provides for increased stability in quartering seas, because of the greater distance between the transom wetted surface and the forward points of the hull that are still in contact with the water. A boat of a given size incorporating the hull configuration of the invention has the feel of a much larger boat, as a result of its increased stability.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A high speed planing boat of generally deep Vee hull form having chines and a keel and which comprises
   (a) a forward hull section having bottom surfaces of generally deep Vee configuration and having a plurality of generally longitudinally extending outer running strakes forming downwardly facing running surfaces adjacent to the chines and having at least one set of intermediate running strakes at intermediate locations between said chines and said keel,
   (b) a first step section joined with said forward hull section by a first shoulder,
   (c) said first step section having bottom surfaces of generally deep Vee configuration elevated with respect to corresponding bottom surface portions of said forward hull section and having outer bottom surface portions and central bottom surface portions separated by generally longitudinally extending intermediate running strakes forming downwardly facing running surfaces,
   (d) said central bottom surface portions of said first step section being elevated to a greater extent, relative to corresponding bottom surface portions of said forward hull section, than bottom surface portions of said first step section adjacent to said chines,
   (e) a second step section joined with said first step section by a second shoulder,
   (f) said second step section having bottom surfaces of generally deep Vee configuration elevated with respect to corresponding bottom surface portions of said first step section and having outer bottom surface portions and central bottom surface portions separated by generally longitudinally extending intermediate running strakes forming downwardly facing running surfaces, and
   (g) said central bottom surface portions of said second step section being elevated to a greater extent, relative to corresponding central bottom surface portions of said forward hull section, than bottom surface portions of said second step section adjacent to said chines.

2. A high speed planing boat according to claim 1, wherein
   (a) a transom is joined with the aft end of said second step section, and
   (b) corresponding points at the aft extremities of the forward hull section, the first step section and the second step section are aligned substantially on a straight line.

3. A high speed planing boat according to claim 2, wherein
   (a) said straight line lies at an angle of about 3° to 4° with respect to extensions of the forward hull section adjacent the aft end edge thereof.

4. A high speed planing boat according to claim 1, wherein
   (a) surface portions of said first and second step sections are disposed at a slight angle inclined upwardly from fore to aft with respect to corresponding surface portions of the forward hull section immediately forward of said first step section.

5. A high speed planing boat according to claim 4, wherein
   (a) surface portions of said first step section are disposed at an angle of about ½° with respect to corresponding surface portions of the forward hull section.

6. A high speed planing boat according to claim 5, wherein
   (a) surface portions of said second step section are disposed at an angle of about ½° with respect to corresponding surface portions of the first step section.

7. A high speed planing boat according to claim 1, wherein
   (a) said central bottom surface portions of said second step section are elevated to a greater extent, relative to corresponding central bottom surface portions of said first step section, than bottom surface portions of said second step section adjacent to said chines.

8. A high speed planing boat according to claim 1, wherein
   (a) the width of said hull at said chines increases progressively from bow to stern.

9. A high speed planing boat of generally deep Vee hull form having chines and a keel and which comprises
   (a) a forward hull section having bottom surfaces of generally deep Vee configuration and having a plurality of generally longitudinally extending outer running strakes forming downwardly facing running surfaces adjacent to the chines and having at least one set of intermediate running strakes at intermediate locations between said chines and said keel,
   (b) a first step section joined with said forward hull section by a first shoulder,
   (c) said first step section having bottom surfaces of generally deep Vee configuration elevated with respect to corresponding bottom surface portions of said forward hull section,
   (d) central bottom surface portions of said first step section adjacent to said keel being elevated to a greater extent, relative to corresponding bottom surface portions of said forward hull section, than bottom surface portions of said first step section adjacent to said chines,
   (e) a second step section joined with said first step section by a second shoulder,
   (f) said second step section having bottom surfaces of generally deep Vee configuration elevated with respect to corresponding bottom surface portions of said first step section,
   (g) central bottom surface portions of said second step section adjacent to said keel being elevated to a greater extent, relative to corresponding central bottom surface portions of said forward hull section, than bottom surface portions of said second step section adjacent to said chines,
   (h) said forward hull section being provided with outer running strakes at said chines and with at least one set of intermediate running strakes at laterally spaced locations intermediate said chines and said keel, (i) said first step section being provided with outer running strakes at said chines and with at least one set of intermediate running strakes at laterally spaced locations intermediate said chines and said keel and aligned generally with corresponding running strakes of said forward hull section and elevated with respect thereto, (j) said central bottom surface portions of said first step section extending laterally between outermost ones of the intermediate running strakes of said first step section, and (k) said outermost intermediate running strakes being of greater width than corresponding intermediate running strakes of said forward hull portion.

10. A high speed planing boat according to claim 9, wherein (a) said second step section is provided with outer running strakes at said chines and with at least one set of intermediate running strakes at laterally spaced locations intermediate said chines and said keel and aligned generally with corresponding running strakes of said first step section and elevated with respect thereto, (b) said central bottom surface portions of said second step section extending laterally between outermost ones of the intermediate running strakes of said second step section, and (c) outermost ones of said intermediate running strakes of said second step section being of greater width than corresponding intermediate running strakes of said first step section.

* * * * *